United States Patent
Shuck

(10) Patent No.: US 8,904,847 B2
(45) Date of Patent: Dec. 9, 2014

(54) LAMINATED CAVITY TOOLING

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 14/102,273

(22) Filed: Dec. 10, 2013

(65) Prior Publication Data

US 2014/0238097 A1    Aug. 28, 2014

Related U.S. Application Data

(60) Provisional application No. 61/770,891, filed on Feb. 28, 2013.

(51) Int. Cl.
| | |
|---|---|
| *B21D 5/02* | (2006.01) |
| *B21K 5/20* | (2006.01) |
| *B21D 37/02* | (2006.01) |
| *B21D 26/031* | (2011.01) |

(52) U.S. Cl.
CPC .................................. *B21D 26/031* (2013.01)
USPC .................... 72/413; 72/478; 72/60; 76/107.1

(58) Field of Classification Search
USPC .......................... 72/478, 413, 56, 60; 76/107.1
See application file for complete search history.

(56) References Cited

U.S. PATENT DOCUMENTS

| | | | | |
|---|---|---|---|---|
| 2,547,168 | A | * | 4/1951 | Nill et al. ...................... 76/107.1 |
| 2,679,172 | A | * | 5/1954 | Clevenger et al. .............. 72/362 |
| 3,474,657 | A | * | 10/1969 | Spiegel ........................... 72/478 |
| 4,752,352 | A | | 6/1988 | Feygin |
| 5,192,560 | A | | 3/1993 | Umetsu et al. |
| 5,398,193 | A | | 3/1995 | deAngelis |
| 5,773,047 | A | | 6/1998 | Cloud |
| 5,878,619 | A | * | 3/1999 | Walczak ......................... 72/478 |
| 6,383,442 | B1 | | 5/2002 | Palmers |
| 6,505,089 | B1 | | 1/2003 | Yang et al. |
| 6,745,446 | B1 | | 6/2004 | Barlier |
| 7,410,606 | B2 | | 8/2008 | Appleby et al. |
| 2004/0128016 | A1 | | 7/2004 | Stewart |

(Continued)

FOREIGN PATENT DOCUMENTS

| | | |
|---|---|---|
| DE | 10236523 A1 | 2/2004 |
| JP | 2008155394 A | 7/2008 |
| NL | 8502453 A | 4/1987 |

OTHER PUBLICATIONS

International Search Report and Written Opinion for counterpart international application No. PCT/US2013/074174, mailed Jun. 6, 2014, 15 pp.

*Primary Examiner* — David B Jones
(74) *Attorney, Agent, or Firm* — Shumaker & Sieffert, P.A.

(57) ABSTRACT

In some examples, a laminated tooling die may include multiple sheets or plates used in conjunction in any of a number of forming operations such as, for example, hydroforming, compression molding, and stamping. The sheets or plates can include an open interior that, when used in conjunction with neighboring sheets, produce a cavity into which a deformable workpiece can be placed and subjected to the forming operation. In some examples, one or more sheets can be coupled with a heat exchanger to impart a heat transfer with the workpiece.

17 Claims, 5 Drawing Sheets

(56) References Cited

U.S. PATENT DOCUMENTS

| | | |
|---|---|---|
| 2004/0247725 A1 | 12/2004 | Lang et al. |
| 2008/0092622 A1* | 4/2008 | Holmquist et al. ............ 72/478 |
| 2009/0084933 A1 | 4/2009 | Appleby et al. |
| 2009/0246436 A1 | 10/2009 | Gorin et al. |
| 2012/0090789 A1 | 4/2012 | Starke |

* cited by examiner

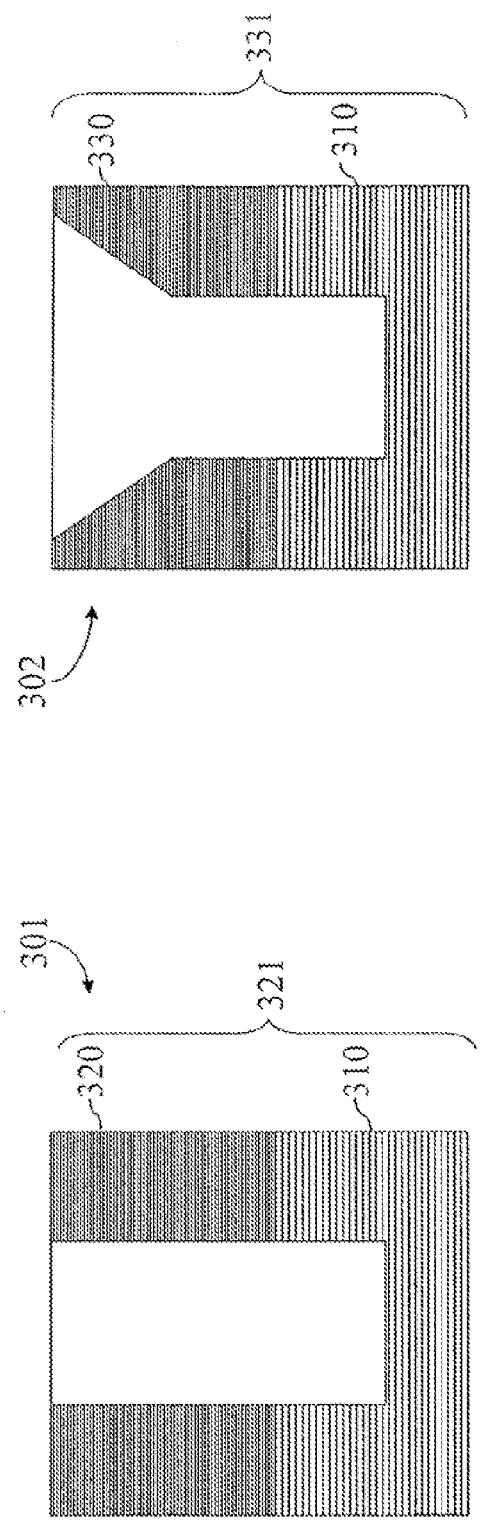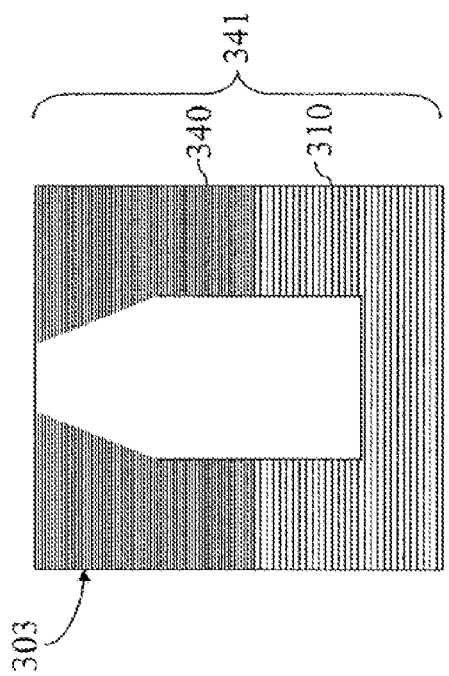
Fig. 3A
Fig. 3B
Fig. 3C

LAMINATED CAVITY TOOLING

This application claims the benefit of U.S. Provisional Application No. 61/770,891, filed Feb. 28, 2013, which is incorporated herein by reference in its entirety.

TECHNICAL FIELD

The present disclosure generally relates to laminated tooling.

BACKGROUND

Providing tooling that provides flexibility in configurability, repair, etc remains an area of interest. Some existing systems have various shortcomings relative to certain applications. Accordingly, there remains a need for further contributions in this area of technology.

SUMMARY

In one example, the disclosure describes an apparatus including a molding die and a molding machine structured to receive and locate a deformable workpiece relative to the molding die in order to carry out a plastic deformation operation when force is applied to the deformable workpiece causing it to plastically deform. In accordance with this example, the molding die may include a plurality of removable die layers connected together to define a void in the molding die into which the deformable workpiece is plastically deformed in the plastic deformation operation. In some examples, the the plurality of removable die layers are structured to produce a first plastic deformation in the deformable workpiece in a first mold deformation process when at least one layer of the plurality of removable die layers is absent during the process. In some examples, the plurality of removable die layers are structured to produce a second plastic deformation subsequent to the first plastic deformation in the deformable workpiece in a second mold deformation process when the at least one layer is present during the process.

In another example, the disclosure describes an apparatus including a molding machine operable to create an article as a result of a plastic deformation process, the molding machine structured to receive a plurality of removable die layers that collectively form a tool die mold useful in forming the article through a plastic deformation process. In accordance with this example, the plurality of removable die layers may include a first die layer having a surface onto which the article can be received; a second layer locatable above the first die layer and having a second layer top, a second layer bottom, and a second layer passage extending from the second layer top to the second layer bottom through which the article can pass; and a third layer locatable above the first die layer having a third layer top, a third layer bottom, and a third layer passage extending from the third layer top to the third layer bottom through which the article can pass.

In a further example, the disclosure describes a method including providing a plastically deformable workpiece having a material composition that can be yielded without rupture under application of load and inserting a first tool layer that defines a well formed in a workpiece receiving side of the tool layer. In accordance with this example, the method also includes placing the plastically deformable workpiece over the well; applying force to yield the workpiece into the well; adding a second tool layer to the first tool layer, the second tool layer having a top side and a bottom side and passage from the top side to the bottom side; and applying another force to yield the workpiece through the second layer.

BRIEF DESCRIPTION OF THE FIGURES

FIG. 3A is a conceptual diagram illustrating another example tooling device.

FIG. 3B is a conceptual diagram illustrating another example tooling device.

FIG. 3C is a conceptual diagram illustrating another example tooling device.

DETAILED DESCRIPTION

Figure 1:
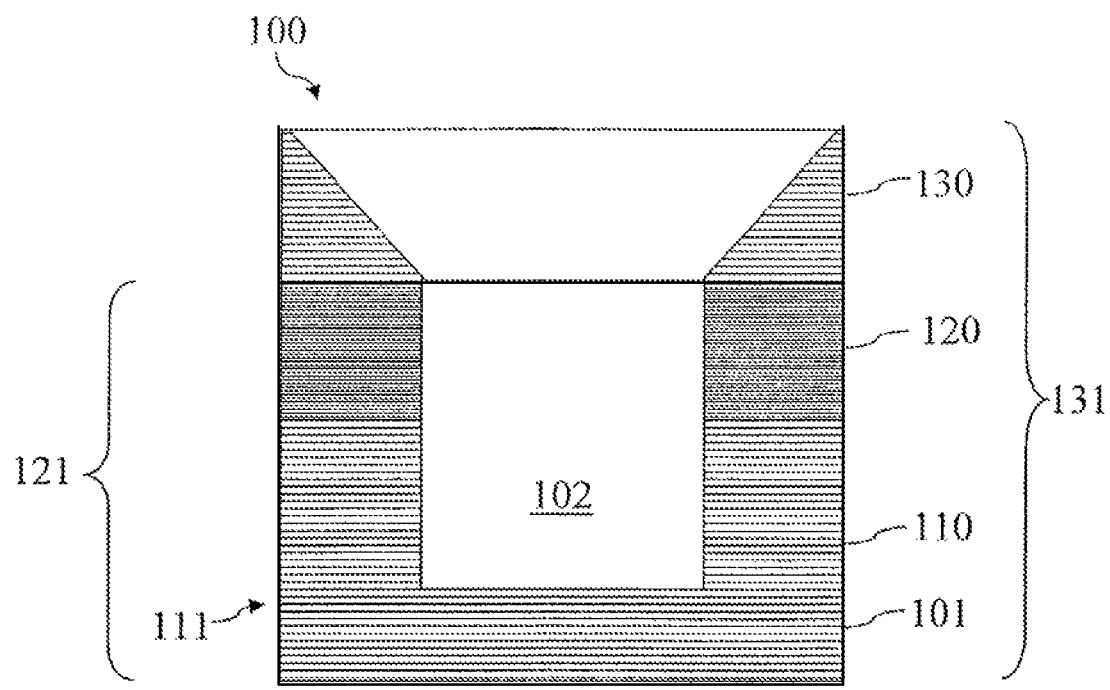
FIG. 1 is a conceptual diagram illustrating an example tooling device.

For the purposes of promoting an understanding of the principles of the disclosure, reference will now be made to the examples illustrated in the drawings and specific language will be used to describe the same. It will nevertheless be understood that no limitation of the scope of the disclosure is thereby intended. Any alterations and further modifications in the described examples, and any further applications of the principles of the disclosure as described herein are contemplated as would normally occur to one skilled in the art to which the disclosure relates.

Laminated tooling is a form of tooling die fabrication which can include cutting contours in multiple sheets or plates, then stacking the sheets or plates to form various profiles. Such laminated tooling can be used in a number of forming operations such as, but not necessarily limited to, hydroforming, compression molding, and stamping. Various illustrated examples described below can be used in a hydroforming operation, but it will be appreciated that the examples or variations thereof can be used in other forming operations. With reference to the conceptual diagram illustrated in FIG. 1, an example tooling device 100 may fabricated as laminated tooling that can be used in the aforementioned example operations. Tooling device 100 can encompass a complete die set with top and bottom punch plates, individual die inserts, die insert sets, knife blade profiles, and the like.

Tooling device 100 in the illustrated example includes layers of stacked sheets or plates 101. Layered sheets 101 can vary in thickness and material from one sheet 101 to another and from one section of tooling device 100 to another. In some examples, the sheets will have a through-thickness dimension that is substantially smaller than its lateral dimensions such as length and width as will be commonly associated with other "sheets" such as a sheet of paper, or sheet stock, etc. When viewed from above the sheets can have any variety of external shapes, such as square, circle, etc., but it will be appreciate that the external shape need not strictly conform to a defined geometric shape. In some examples, the sheets will have an appearance, when viewed from above, of a plate having an open interior, or cavity 102, that is defined by lateral edges of the plate. As used herein, the terms "sheet", "plate", "layer", etc. are intended to be used interchangeably unless specifically indicated to the contrary, similar with terms such as "open interior", "cavity", etc., which are also intended to be used interchangeably unless specifically indicated to the contrary. The open interior of the sheet is used to receive a workpiece that is subject to forming operations such as, but not limited to, hydroforming, compression molding, and stamping as discussed above. Furthermore, the edge of the sheet that defines the open interior can be smooth in some forms, can be roughened in others, and in still others can have features formed therein such as texturing, threads, etc. The open interior may not extend through the thickness in some sheets. For example, an end sheet may have a depression formed therein that does not otherwise extend through the thickness.

Alignment of sheets 101 can be accomplished by forming locating features in the sheets 101, but other techniques of alignment can also be utilized as will be appreciated. Locating features can include holes or notches of various shapes, sizes and location, and in some alternative and/or additional forms can include common exterior dimensions. Methods used to form the locating features can include laser cutting, CNC milling, etc. and can also include additive methods such as laser welding and direct laser metal deposition, among potential others.

When used together, the layers of sheets 101 can form a die shape that produces various types of components having any variety of shapes, from simple to complex. In some examples, the shape can be a tube that is subject to a deep draw progressively formed as will be described further below. The dimensions and features of a component formed using the sheets 101 can vary from one section of the component to another. In some examples, the components formed using the sheets 101 can have one or both positive and negative features which might not be able to be extracted from solid tooling but can be extracted with any variety of the examples of a laminate die described herein.

Returning to tooling device 100 in FIG. 1, sheets 101 of tooling device 100 are arranged to define cavity 102 in the illustrated example. Multiple sections (e.g. 110, 120, and 130) of layered sheets 101 are used to define the cavity 102 in which a component can be formed in one or more forming operations. Layers 101 are grouped into separate "sections" in the illustrated example, but it will be appreciated that other examples of tooling device 100 need not include grouped layers but instead can rely upon multiple layers that are not labeled or otherwise collected in a grouping as "sections."

A first set 110 of laminated sheets 101 can be arranged to form a first tool configuration 111. First tool configuration 111 can be capable of providing cavity 102 for a single stage manufacturing process or as one stage in a multi-stage manufacturing process. For example, in the multi-stage manufacturing process, a small number of sheets 101 used in the total tool configuration 111 can be used in one stage of the multi-stage process, and then a subsequent sheet, or sheets, can be added or replaced before conducting another stage of the multi-stage process. Such replacement can include replacement with a similar or different sheet configuration.

In some examples, the tool configuration 111 can be used to form a component to the inclusion of additional sheets that form one component in one forming operation, and the inclusion of other additional shapes to form a different component in another forming operation. Thus, further stages can be used to produce different components depending on the configuration of the further stages. These variations also apply to any of the examples described herein.

For the example of FIG. 1, a second set 120 of laminated sheets 101 is combined with first set 110 of laminated sheets 101 and arranged to form a second tool configuration 121. In some examples, combining the sets 110 and 120 of laminated sheets can include the steps of adding to or replacing laminated sheets associated with each section. As above, the second tool configuration 121 can be capable of providing cavity 102 for a single stage manufacturing process or as one stage in a multi-stage manufacturing process.

In the example shown in FIG. 1, a third set 130 of laminated sheets 101 may be combined with first set 110 and second set 120 of laminated sheets 101 to form a third tool configuration 131. In some examples, combining the sets 110, 120, and 130 of laminated sheets 101 can include the steps of adding to or replacing laminated sheets associated with each section. As above, the third tool configuration 131 can be capable of providing cavity 102 for a single stage manufacturing process or as one stage in a multi-stage manufacturing process.

Figure 1A:
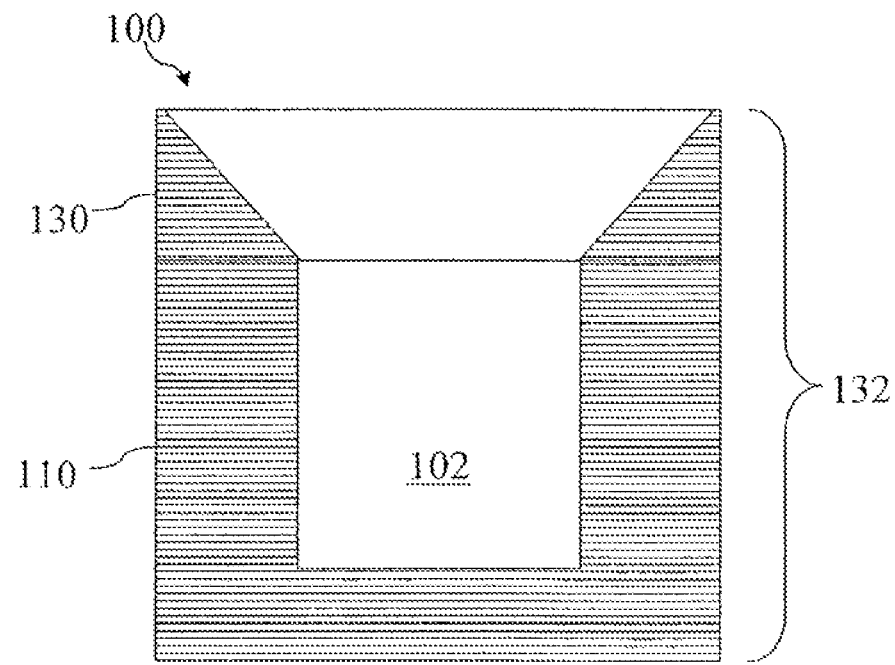
FIG. 1A is a conceptual diagram illustrating another example tooling device.

In another example shown in FIG. 1A, third set 130 of laminated sheets 101 is combined with first set 110 of laminated sheets 101 to form a fourth tool configuration 132 of tooling device 100. In some examples, combining the sets 110 and 130 of laminated sheets 101 can include the steps of adding to or replacing laminated sheets associated with each section. As above, the fourth tool configuration 132 can be capable of providing cavity 102 for a single stage manufacturing process or as one stage in a multi-stage manufacturing process.

Figure 2:
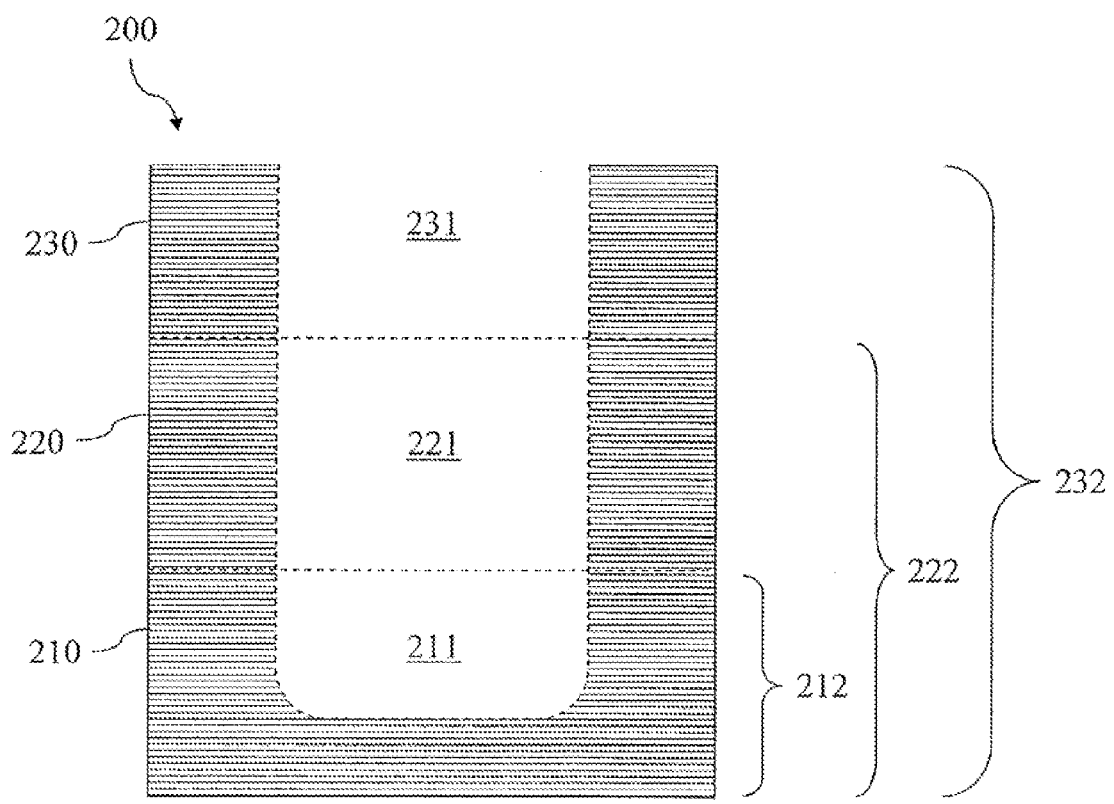
FIG. 2 is a conceptual diagram illustrating another example tooling device.

FIG. 2 is a conceptual diagram illustrating another example tooling device 200 which can be used as a progressive die. Progressive metal forming can include the application of a series of manufacturing processes to a component due to the features of the component being unattainable in a single manufacturing step. Such features can include a deep drawn portion where a material limitation prevents the deep drawn portion from being formed in a single step. Another example feature is a compound feature, such as a subsequent fold or bend being formed over or in an initially formed feature. As used herein, relative spatial terms such as "over", "above", "top", "bottom", "under", etc. are used for convenience of reference and are not to be construed to require an absolute spatial position (e.g. at a higher elevation).

In the example illustrated in FIG. 2, progressive tooling device 200 can allow deep drawn shapes to be formed. For example, a first set 210 of layers can be arranged in a first tool configuration 212 having a cavity 211. The first tool configuration 211 may form a first stage of progressive tooling device 200 and represent the shallowest draw of a progressive forming operation. A second set of layers 220 can be arranged in a second tool configuration 222 that results in a cavity 221 which represents the space above, and including, the cavity formed by the first tool configuration 212. The second tool configuration 222 may form a second stage of progressive tooling device 200 and represent a medium draw of a progressive forming operation. FIG. 2 also shows a third set of layers 230 that may be arranged to form a third tool configuration 232 having a cavity 231, which may represent the space above and including the cavities 221/222 formed by the first tool configuration 212 and second tool configuration 222. The third tool configuration 232 may form a third stage of progressive tooling device 200 and represent the deepest draw of a progressive forming operation.

Progressive tooling device 200 can include a varied number of tool configurations and progressive forming stages and is not limited to three configurations and progressive forming stages. In some examples, first stage can process a portion of a raw material and can then be followed by any number or order of subsequent stages to obtain the desired component shape or profile. The shape of the tooling cavity can also vary between configurations and stages. In some examples, progressive tooling device 200 as shown in FIG. 2 can provide a deep drawn feature. However, in other examples, other forms of progressive tools as known by one skilled in the art are also contemplated. While the tool configuration shown in the example illustrated in FIG. 2 has a fairly uniform cavity width, other examples can include tool configurations which widen through the stages or change shape through the stages. Thus, a layer that is used to form a portion between ends of a device can be replaced with another layer having a different die forming configuration to subsequently form a feature in the component at the location between the ends.

FIGS. 3A-3C are conceptual diagram illustrating other example tooling devices 301, 302, 303 that all share a common set 310 of layers but include different upper stages resulting in various tool configurations. In this way, the upper stages can be interchangeable. FIG. 3A shows an example of tooling device 301 including first set 310 of layers and a second set 320 of layers arranged to form a first tool configuration 321 having uniform cross section. FIG. 3B shows an example tooling device 302 including first set 310 of layers combined with a third set 330 of layers and arranged to form a widening tool configuration 331. FIG. 3C shows an example tooling device 303 including first set 310 of layers combined with a fourth set 340 of layers and arranged to form a narrowing tool configuration 341. The narrowing tool configuration 341 is just one example of many in which a component having an undercut that can be formed. Various geometries of an undercut can be formed other than the steeply drawn side shown in FIG. 3C. For example, an undercut that is formed at a right angle to a side portion of a component is also contemplated herein. In some examples, undercuts can be of such a nature that the workpice cannot be extracted without first removing one or more layers. In some examples, a tool configuration may include a narrowing mid-section, and one or more layers may need to be removed from both ends prior to extraction of the workpiece.

Features of the described tool configurations are exemplary and are not meant to limit the present disclosure to a particular shape or configuration.

In some examples, a portion of first set 310 of layers is replaced with at least a portion of other sets 320, 330, 340 of layers. Multiple sets of layers can be arranged to form multiple tool configurations. The sets of layers can be combined in a number of ways to provide variability and flexibility in tool configuration design. In some examples, a tool configuration can be formed with multiple sets of layers where at least one set of layers is removable. When the removable set of layers is removed, the tool configuration is then reverted back to the previous tool configuration without damage to or reduction in integrity of the tool or the expense of modifying or producing a separate solid tool device.

Other examples include modifying a set of laminate layers where heat treat distortion and residual stress can be reduced or minimized by heat treating individual layers rather than complete tools. Another example can include arranging a set of laminate layers to vary the sheet material and properties as needed by various design features such as hardness, lubricity, wear resistance, thermal stresses, mechanical stresses and the like.

In some examples, any given layer can be used to exchange heat with a workpiece that is located in the open interior which the layer is used to define. The layer that is used to exchange heat with the workpiece can have a heat exchanger integrated therein, and/or can be in thermal contact with a heat source or heat sink. The heat exchanger can be in the form of an internal passage through which a heat exchange fluid, whether in a liquid, vapor, or multi-phase form, is allowed to traverse. The heat exchanger can be located in one or multiple locations of the layer. Adjacent layers can have the same or different configuration of heat exchangers and/or be in the same or different thermal contact with a heat source or heat sink.

Figure 4A:
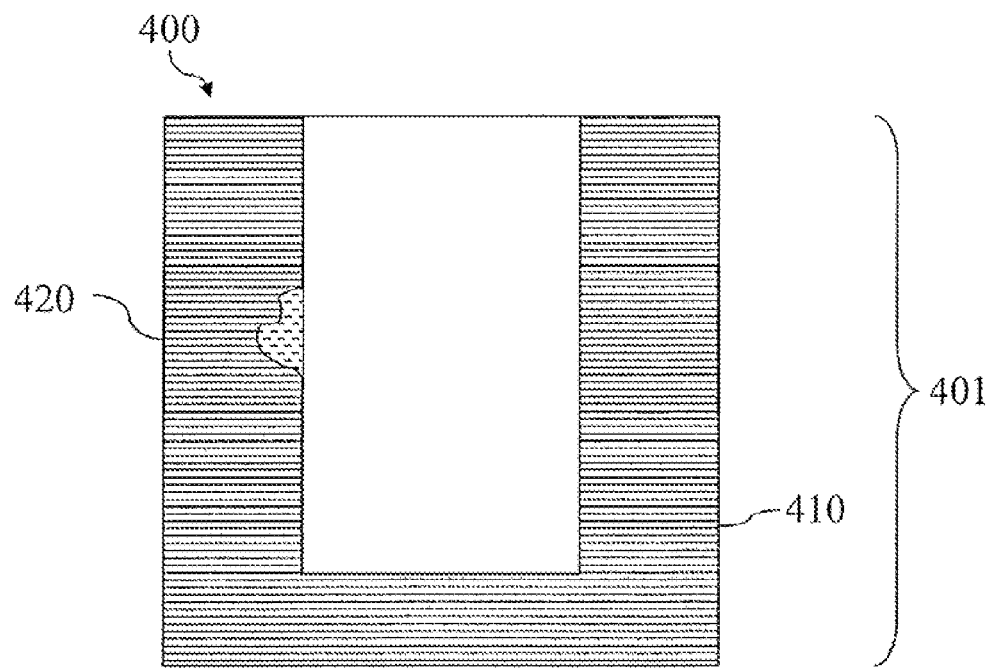
FIG. 4A is a conceptual diagram illustrating an example damaged tooling device.
Figure 4B:
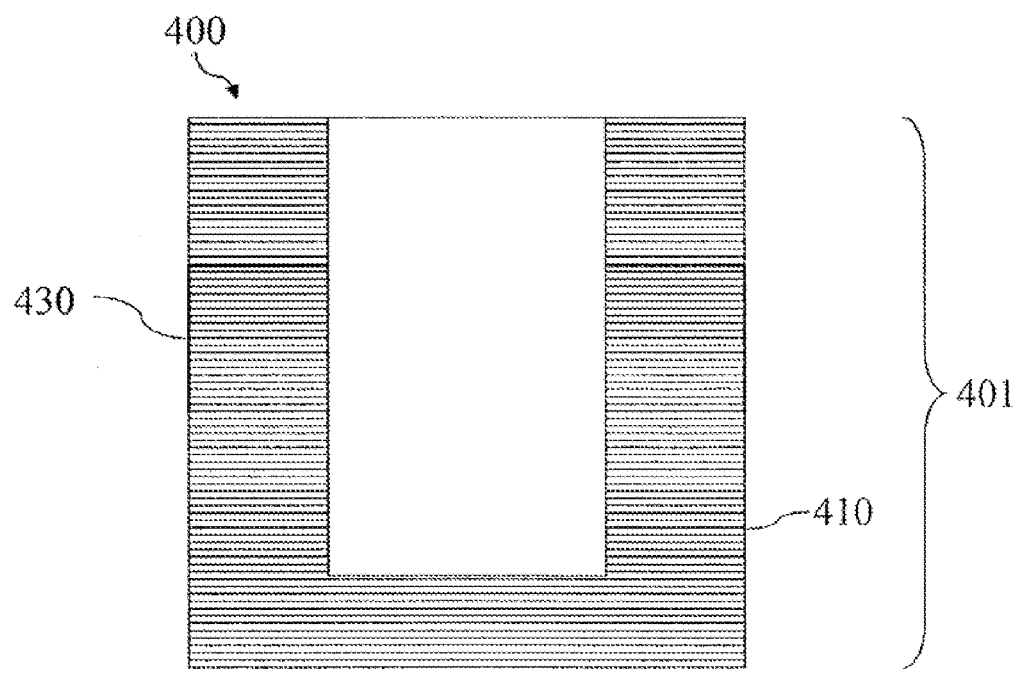
FIG. 4B is a conceptual diagram illustrating an example repaired tooling device.

FIG. 4A a conceptual diagram illustrating an example damaged tooling device, and FIG. 4B is a conceptual diagram illustrating an example repaired tooling device. A laminate tooling device 400 includes a set of laminate layers 410 arranged to form a tool configuration 401. FIG. 4A illustrates a damaged portion 420 of laminate tooling device 400. Damage can include physical damage, wear, imperfections, and the like. With laminated tooling device 400, after identifying a damaged portion, damaged portion 420 can be removed and replaced with a non-damaged portion 430, as illustrated in FIG. 4B, without requiring the production of a new tooling device. Non-damaged portion 430 may be arranged with set of laminated layers 410 to form tool configuration 401. Laminated tooling devices allow rapid selective replacement of areas that have been damaged, areas that experience high wear, or areas having other non-conforming portions.

Figure 5:
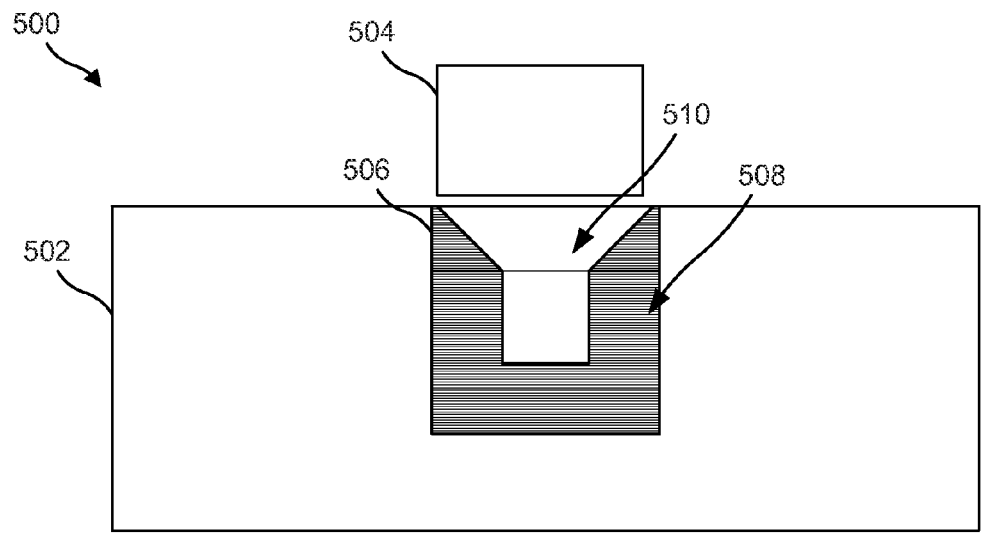
FIG. 5 is a conceptual diagram illustrating an apparatus configured to be used in a plastic deformation operation on a workpiece.

FIG. 5 is a conceptual diagram illustrating an apparatus configured to be used in a plastic deformation operation on a workpiece. In the example of FIG. 5, apparatus 500 includes a molding machine 502 structured to receive and locate a deformable workpiece 504 relative to a molding die 506. Molding machine 502 also is structured to receive a plurality of removable die layers that collectively form a tool die mold or molding die 506. Molding die 506 includes a plurality of removable die layers 508 connected together to define a void 510 in the molding die 506 into which deformable workpiece 504 is plastically deformed in a plastic deformation operation carried out using molding machine 502. Although FIG. 5 illustrates a particular configuration of molding die 506, in other examples, other configurations may be used, including, for example, any of the configurations of the laminated tooling devices illustrated in FIGS. 1-4.

Figure 6:
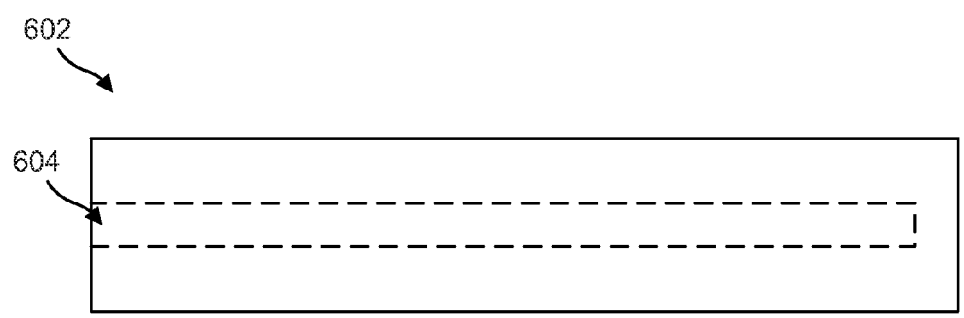
FIG. 6 is a conceptual diagram illustrating a layer that may be used as a layer in any of the laminated tooling devices or molding dice described herein.

FIG. 6 is a conceptual diagram illustrating a layer that may be used as a layer in any of the laminated tooling devices or molding dice described herein. As shown in FIG. 6, layer 602 includes a heat exchanger 604. In the example illustrated in FIG. 6, heat exchanger 604 includes an internal passage defined in layer 602. The internal passage may be configured to convey a heat exchange fluid. As shown in FIG. 6, heat exchanger 604 may be limited to reside in one area of layer 602.

While the disclosure has been illustrated and described in detail in the drawings and foregoing description, the same is to be considered as illustrative and not restrictive in character, it being understood that only the some examples have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and examples lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a molding die; and
a molding machine structured to receive and locate a deformable workpiece relative to the molding die to carry out a plastic deformation operation when force is applied to the deformable workpiece causing it to plastically deform,
wherein the molding die comprises a plurality of removable die layers connected together to define a void in the molding die into which the deformable workpiece is plastically deformed in the plastic deformation operation,
wherein the plurality of removable die layers comprises a first set of die layers and a second set of die layers,
wherein the first set of die layers and the second set of die layers are separately removable,
wherein the first set of die layers is structured to produce a first plastic deformation in the deformable workpiece in a first mold deformation process when the second set of die layers is absent during the process,
wherein the plurality of removable die layers are structured to produce a second plastic deformation subsequent to the first plastic deformation in the deformable workpiece in a second mold deformation process when the second set of die layers is present during the process, and
wherein the second set of die layers forms a narrowing tool configuration such that the second plastic deformation forms an undercut in the deformable workpiece.

2. The apparatus of claim 1, wherein the molding machine comprises a hydroforming machine, a compression molding machine, or a stamping machine.

3. The apparatus of claim 1, wherein the second set of die layers is located at a distal end from the first set of die layers, wherein the molding machine comprises a progressive molding machine, and wherein:
the first set of die layers is configured to produce an extension of the deformable workpiece during the first mold deformation process, and
the plurality of removable layers further comprises a third set of die layers configured to produce a further extension of the deformable workpiece during a third mold deformation process.

4. The apparatus of claim 1, wherein, during the absence of the second set of die layers, a third set of die layers is connected with the first set of die layers to produce a different configuration than the plurality of die layers when the second set of die layers is present during the second mold deformation process.

5. The apparatus of claim 1, wherein at least one of the plurality of removable die layers is configured to exchange heat with the deformable workpiece during the plastic deformation operation.

6. The apparatus of claim 5, wherein the at least one of the plurality of removable die layers comprises a heat exchanger, wherein the heat exchanger comprises an internal passage for the conveyance of a heat exchange fluid, and wherein the heat exchanger is located within the at least one of the plurality of removable die layers.

7. An apparatus comprising:
a molding machine operable to create an article as a result of a plastic deformation process, the molding machine structured to receive a plurality of removable die layers that collectively form a tool die mold useful in forming the article through a plastic deformation process, the plurality of removable die layers comprising:
a first die layer having a surface onto which the article can be received;
a second layer locatable above the first die layer and having a second layer top, a second layer bottom, and a second layer passage extending from the second layer top to the second layer bottom through which the article can pass;
a third layer locatable above the first die layer having a third layer top, a third layer bottom, and a third layer passage extending from the third layer top to the third layer bottom through which the article can pass; and
a fourth layer locatable above the first die layer and having a fourth layer top, a fourth layer bottom, and a fourth layer passage extending from the fourth layer top to the fourth layer bottom through which the article can pass, wherein the second layer, the third layer, and the fourth layer together form an undercut.

8. The apparatus of claim 7, wherein the surface of the first die layer is formed as an opening on a top of the first die layer, wherein the opening does not extend through the first die layer, and wherein the second layer is vertically above the first die layer.

9. The apparatus of claim 7, wherein the machine is one of a hydroforming machine, a compression molding machine, and a stamping machine.

10. The apparatus of claim 9, further including a plurality of additional layers that are used to progressively form the article in a series of forming steps, and wherein at least one of the first layer, second layer, and third layer include heat exchange member structured to exchange heat with the article.

11. A method comprising:
providing a plastically deformable workpiece having a material composition that can be yielded without rupture under application of load;
inserting a first tool layer that defines a well formed in a workpiece receiving side of the tool layer;
placing the plastically deformable workpiece over the well;
applying force to yield the workpiece into the well;
adding a second tool layer to the first tool layer, the second tool layer having a top side and a bottom side and passage from the top side to the bottom side; and
applying another force to yield the workpiece through the second layer.

12. The method of claim 11, further including adding a plurality of additional layers to the first tool layer and second tool layer, each of the plurality of additional layers including a passage through respective top sides and bottom sides of the plurality of additional layers.

13. The method of claim 12, further including applying a plurality of additional forces to progressively yield the workpiece through the plurality of additional layers.

14. The method of claim 11, wherein adding the second tool layer comprises removing the first tool layer before adding the second tool layer.

15. The method of claim 11, further including expanding the workpiece in a radially outward direction to reach an undercut formed by the combined use of the first tool layer and the second tool layer.

16. The method of claim 11, wherein the applying force is one of a imparting a differential pressure and a mechanical pressure to a side of the plastically deformable workpiece, and wherein the differential pressure is imparted by applying a liquid pressure.

17. The method of claim 11, further including exchanging heat between the workpiece and at least one of the first tool layer and the second tool layer, wherein the at least one of the first tool layer and the second tool layer comprises a heat exchanger.

* * * * *